US012688051B2

(12) United States Patent (10) Patent No.: US 12,688,051 B2
Gattani et al. (45) Date of Patent: Jul. 21, 2026

(54) EXTRACTING DATA FROM HETEROGENEOUS SOURCES WITH LIBRARY CONFLICTS

(71) Applicant: Oracle International Corporation, Redwood Shores, CA (US)

(72) Inventors: Rohit Jaykumar Gattani, Pleasanton, CA (US); Rahul Gupta, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 317 days.

(21) Appl. No.: 18/487,435

(22) Filed: Oct. 16, 2023

(65) Prior Publication Data

US 2024/0256296 A1 Aug. 1, 2024

Related U.S. Application Data

(60) Provisional application No. 63/442,397, filed on Jan. 31, 2023.

(51) Int. Cl.
*G06F 9/445* (2018.01)
*G06F 9/455* (2018.01)
(52) U.S. Cl.
CPC ...... *G06F 9/44526* (2013.01); *G06F 9/44521* (2013.01); *G06F 9/45529* (2013.01)
(58) Field of Classification Search
CPC ............. G06F 9/44526; G06F 9/45529; G06F 9/44521
See application file for complete search history.

(56) References Cited

U.S. PATENT DOCUMENTS

2009/0249311 A1* 10/2009 Dandamudi ........ G06F 9/44526
717/139
2012/0159145 A1* 6/2012 Cheong ..................... G06F 8/61
713/100
(Continued)

FOREIGN PATENT DOCUMENTS

JP 2013186779 A * 9/2013
WO WO-2024082875 A1 * 4/2024 ............. G06F 9/505

OTHER PUBLICATIONS

"ClassLoader in Java", Javapoint, Retrieved from https://www.javatpoint.com/classloader-in-java, Retrieved on Oct. 17, 2023, pp. 1-14.
(Continued)

*Primary Examiner* — Geoffrey R St Leger
(74) *Attorney, Agent, or Firm* — Invoke

(57) ABSTRACT

Techniques for instantiating a reference type to create a first descendant loader and a second descendant loader. The first descendant loader and the second descendant loader may be isolated loaders. The first descendant loader may load a first plugin and a first set of libraries. The first set of libraries may be needed to complete a first operation. The second descendant loader may load a second plugin and a second set of libraries. The second set of libraries may be needed to complete a second operation. The first set of libraries may conflict with the second set of libraries. A first method of the first plugin may be invoked through a plugin interface in order to complete the first operation. A second method of the second plugin may be invoked through the plugin interface to complete the second operation.

20 Claims, 7 Drawing Sheets

(56) References Cited

U.S. PATENT DOCUMENTS

| | | | |
|---|---|---|---|
| 2014/0040874 A1* | 2/2014 | Wilson | G06F 9/44552 |
| | | | 717/170 |
| 2017/0308310 A1* | 10/2017 | Goetz | G06F 9/44521 |

OTHER PUBLICATIONS

"How to access an object instance loaded by the other classloader exception for using reflection?", Retrieved from https://stackoverflow.com/questions/3562593/how-to-access-an-object-instance-loaded-by-the-other-classloader-exception-for-u, Retrieved on Oct. 17, 2023, pp. 1-2.

* cited by examiner

Class File 200

Virtual Machine Memory Layout
300

EXTRACTING DATA FROM HETEROGENEOUS SOURCES WITH LIBRARY CONFLICTS

INCORPORATION BY REFERENCE; DISCLAIMER

The following application is hereby incorporated by reference: application no. 63/442,397 filed Jan. 31, 2023. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to data extraction. In particular, the present disclosure relates to data extraction from heterogeneous sources.

BACKGROUND

A method for completing an operation that is executed in an execution environment may require the use of one or more libraries. The required libraries may be loaded into memory by a loader. Loading may occur prior to or during runtime. Two or more methods executed in an execution may require the use of different libraries. The different libraries may conflict. The library conflicts may result in the failure of operations.

A library may contain one or more types. Two or more libraries may be said to conflict if the libraries contain conflicting types. Two or more types may be said to conflict if the types have the same name but are otherwise different. For example, consider a first type that is required for a first operation and a second type that is required for a second operation. Assume that the first type and the second type have the same name. The loader(s) of an execution environment may refuse to load more than one type of a given name into memory. Thus, in this example, one of the two types may not be loaded into memory. Consequently, the first operation and the second operation may both have to rely on either the first type or the second type. However, because the two types are different the first type may not work for the second operation and/or the second type may not work for the first operation. Therefore, the first operation or the second operation may fail. It should be understood that the foregoing scenario is just one of many examples in which types and/or libraries may be said to conflict.

In one approach, errors resulting from conflicting libraries have been circumvented by ensuring that, prior to runtime, only non-conflicting libraries will be loaded. In another approach to avoiding errors that result from library conflicts, separate processes are spawned for each operation. However, some use cases may require that the data that results from one operation be processed together with the data that results from another operation. Use cases that require data resulting from different operations be processed together may be further complicated if the data resulting from the different operations is heterogenous. For example, the data resulting from one operation may be of a different data model than the data that results from another operation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
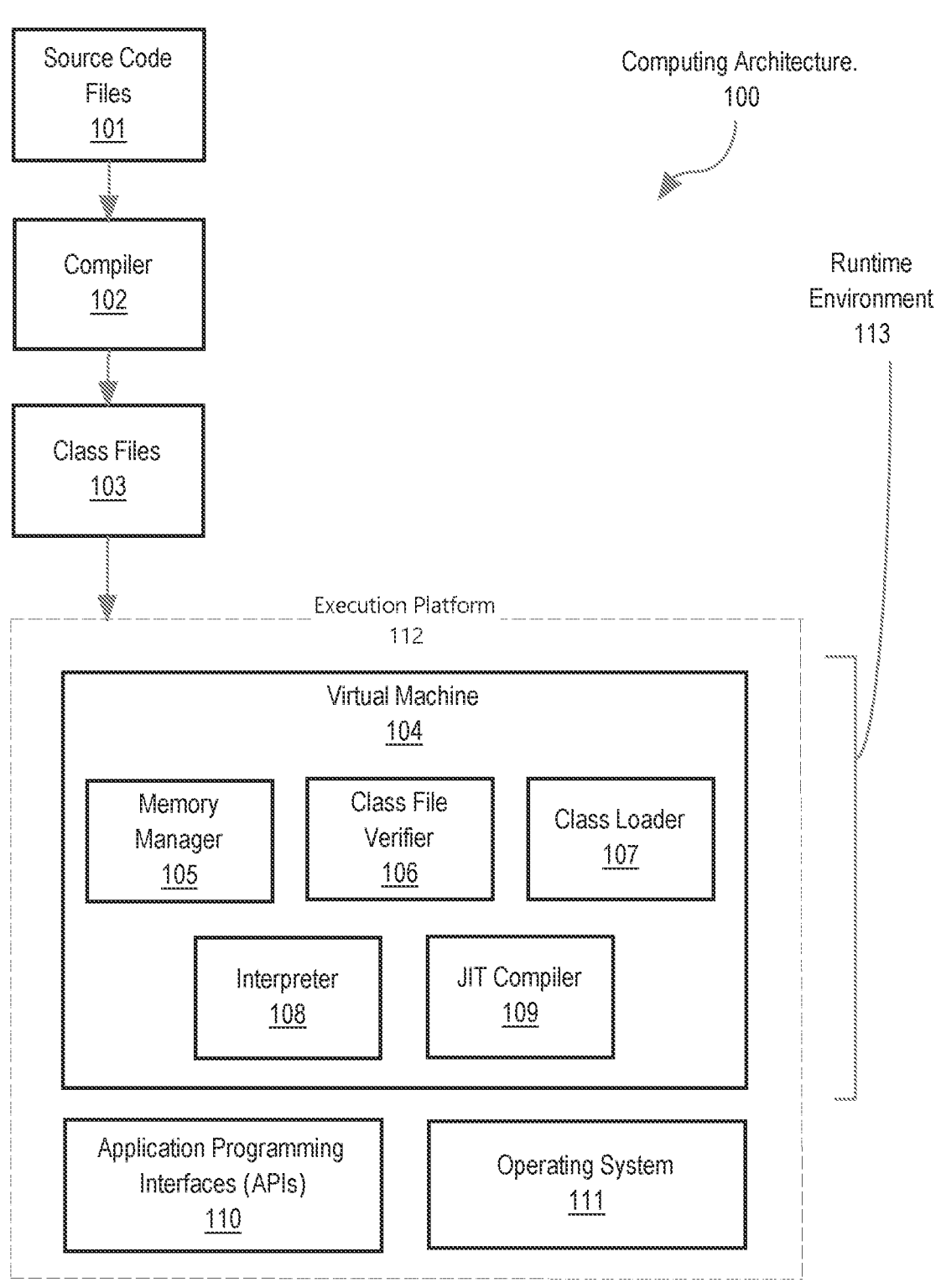
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

The following table of contents is provided for the reader's convenience and is not intended to define the limits of the disclosure.

1. INTRODUCTION
2. GENERAL OVERVIEW
3. ARCHITECTURAL OVERVIEW
    3.1. EXAMPLE ARCHITECTURE
    3.2. EXAMPLE CLASS FILE STRUCTURE
    3.3. EXAMPLE VIRTUAL MACHINE ARCHITECTURE
    3.4. LOADING, LINKING, AND INITIALIZING
    3.5. LOADERS
4. PREVENTING LIBRARY CONFLICTS
5. ACCESSING TYPES LOADED BY ISOLATED LOADERS
6. EXTRACTING AND CONVERTING DATA
7. HARDWARE OVERVIEW
8. MISCELLANEOUS; EXTENSIONS

1. Introduction

As noted above, a method for completing an operation that is executed in an execution environment may require the use of a set of libraries. Instructions for completing the operation that requires the set of libraries may be included in a method of a type. The type may be included in a plugin. A method of a type of a plugin may be referred to herein as a "plugin method." The plugin and the set of libraries may be loaded by one or more loaders. The method may subsequently be executed in the execution environment.

Methods that may need to be executed in an execution environment may require a respective set of libraries. Consequently, two or more sets of libraries may need to be loaded. However, in some cases, a loader may refuse to load a set of libraries. A loader may refuse to load an entire set of libraries, or a loader may refuse to load a portion of a set of libraries. A loader may refuse to load a set of libraries, in whole or in part, for various reasons. For example, two or more sets of libraries may each contain a type having a common name. If two sets of libraries each contain a type of a common name, a loader may at least refuse to load one of the two types. There may be many pairs of types that have the same name that are shared between two sets of libraries. If an operation requires a type that has been excluded, it may result in the failure of that operation.

It should be noted that the exclusion of a type that is required for an operation may not guarantee failure of that operation. For example, an operation may not fail if one of two identical types are excluded. However, if one of two conflicting types is excluded, an operation that depends on the excluded type may fail.

2. General Overview

One or more embodiments execute methods that require conflicting types in the same execution environment by loading the conflicting types through isolated loaders and by utilizing an abstract reference type that is accessible to the isolated loaders to access types that are loaded by the isolated loaders. Heterogeneous data resulting from method executions may be converted to a standard data model that is accessible to the isolated loaders.

As an example, two conflicting libraries may include types with a same name that cannot be loaded into an execution environment by the same type loader. Loading the libraries through isolated loaders allows for loading of two conflicting libraries into an execution environment. The types, loaded by isolated loaders, may be accessed through an interface to execute methods. The methods, defined by different types, may return heterogenous data. The system converts the heterogenous data to a standard data model.

In an embodiment, a new loader may be created for each set of libraries. A group of two or more loaders may be referred to as "isolated loaders" if each loader of the group is mutually excluded from generally accessing the types that are loaded by the other loader(s) of the group. The loaders of an execution environment may be organized into a hierarchy of loaders. The prospective isolation of two or more loaders may depend on each loader's respective position in the hierarchy. The position of a particular loader within the hierarchy may depend on how the particular loader was created. Each loader that is created to load a set of libraries may be created such that it is isolated from any other loader that may load a set of libraries. Each set of libraries may be loaded with a corresponding plugin that includes the method(s) that require the set of libraries.

A plugin and a set of libraries may be loaded by the same isolated loader so that the methods of the plugin may access the types of the set of libraries. However, as a result of each plugin being loaded by an isolated loader, there may be no one type or instance that generally can access all of the plugins in order to invoke the methods of the plugins. Moreover, some use cases may require that a particular plugin or instance invoke the methods of each plugin, and that particular type or instance may be unable to access any of the plugins. A plugin interface may be utilized as a workaround to provide access to the plugins. The plugin interface may be loaded such that the plugin interface is accessible to each plugin. Because each plugin may access the plugin interface, each plugin may implement the interface. The methods of the plugins may be invoked through the plugin interface. The execution of certain plugin methods may result in the return of data objects. Different data objects returned by different plugins may accord to different data models. Some uses cases may require that the data objects be processed together. However, the different data models may be a barrier to doing so. Therefore, each data object may be converted according to a generic data model. Converting the data objects according to the generic data model may allow the data objects to be processed concurrently in a type-safe manner.

3. Architectural Overview

3.1 Example Architecture

FIG. 1 illustrates an example architecture in which techniques described herein may be practiced. Software and/or hardware components described with relation to the example architecture may be omitted or associated with a different set of functionalities than described herein. Software and/or hardware components, not described herein, may be used within an environment in accordance with one or more embodiments. Accordingly, the example environment should not be constructed as limiting the scope of any of the claims.

As illustrated in FIG. 1, computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C #, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both) and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above-described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "type" defined in the source code files 101 (or dynamically generated by the compiler 102/virtual machine 104). A "type" may refer to a primitive type, a reference type, and/or other categories of types. Classes and interfaces are examples of types. A class is reference type that may be used as a template for the properties and behaviors of objects associated with the class. A class may include fields and methods associated with the objects of the class. An interface is a reference type that may be implemented by a type. A type that implements an interface may inherit methods of the interface and/or provide implementation to methods of the interface. The aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of types that provide related functionality. For example, a library may contain one or more class files that implement input/output (I/O) operations, mathematics tools, cryptographic techniques, graphics utilities, and so forth. Further, some types (or fields/methods within those types) may include access restrictions that limit their use to within a particular type/library/package or to types with appropriate permissions.

3.2 Example Class File Structure

Figure 2:
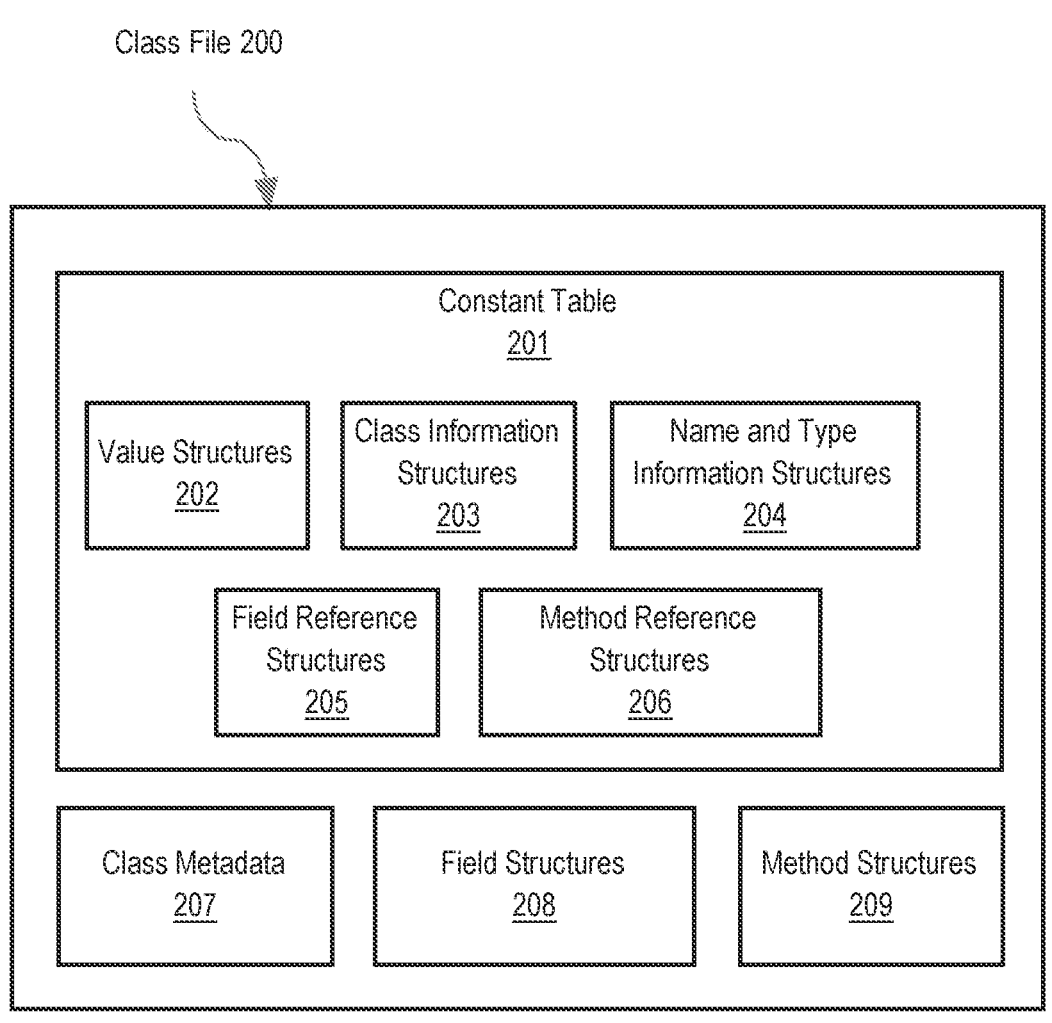
FIG. 2 depicts a block diagram illustrating one embodiment of a computer system suitable for implementing methods and features described herein.

FIG. 2 illustrates an example structure for a class file 200 in block diagram form according to an embodiment. In order to provide clear examples, the remainder of section 2.2 of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.2, "the class" or "the present class" refers to the class represented by the class file 200.

In FIG. 2, the class file 200 includes constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index I to structure j. However, the exact implementation of the constant table 201 is not critical.

In some embodiments, the entries of constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files "0" as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

3.3 Example Virtual Machine Architecture

Figure 3:
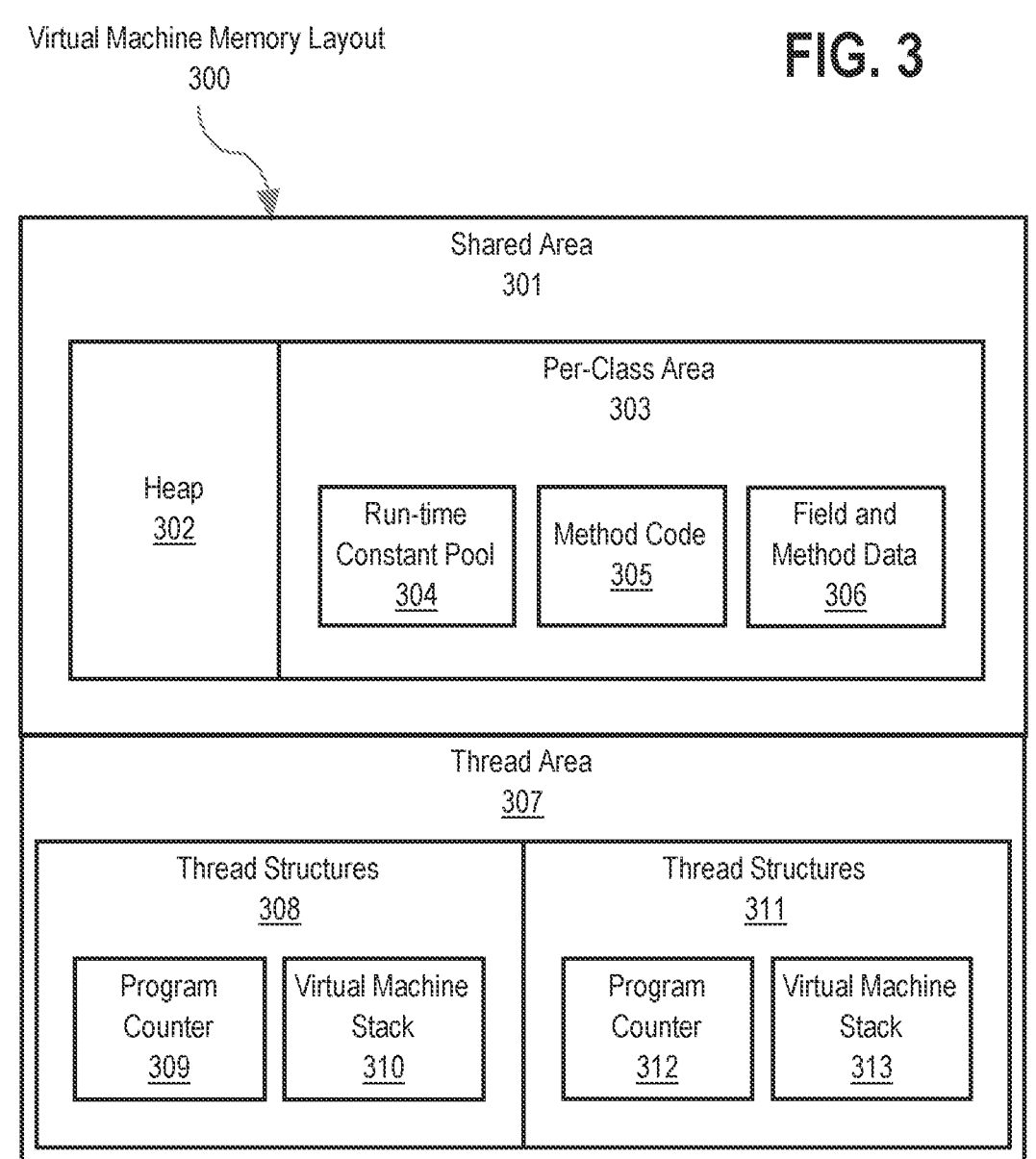
FIG. 3 illustrates an example virtual machine memory layout in block diagram form according to an embodiment.

FIG. 3 illustrates an example virtual machine memory layout 300 in block diagram form according to an embodiment. In order to provide clear examples, the remainder of section 3.3 will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field, and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
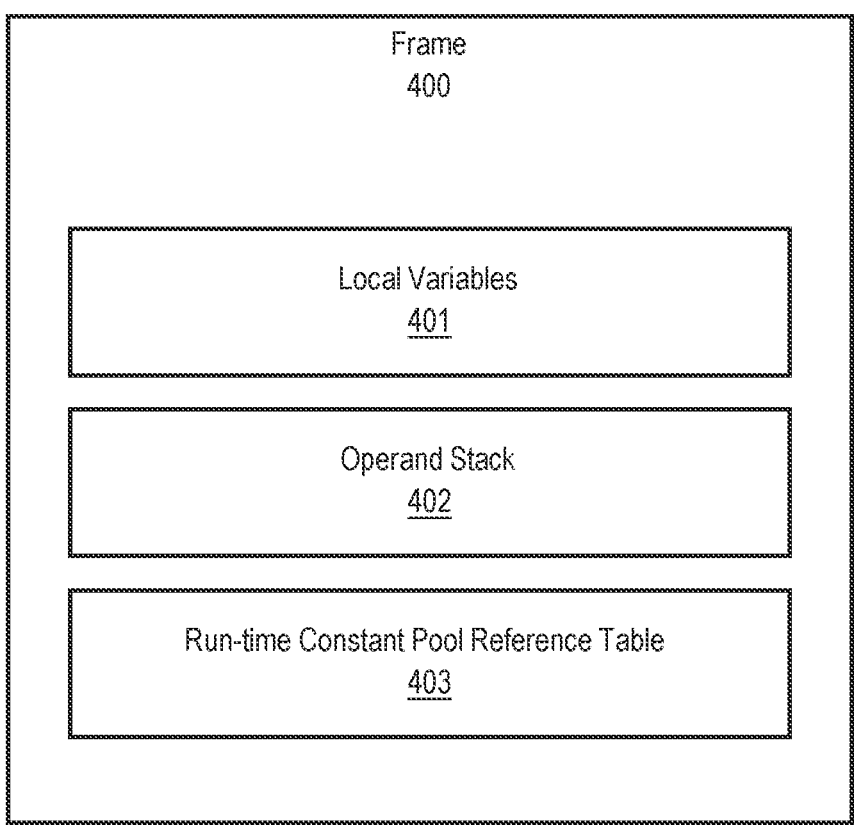
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

3.4 Loading, Linking, and Initializing

In an embodiment, the virtual machine 104 dynamically loads, links, and initializes types. Loading is the process of finding a type with a particular name and creating a representation from the associated class file 200 of that type within the memory of the runtime environment 113. For example, creating the run-time constant pool 304, method code 305, and field and method data 306 for the type within the per-class area 303 of the virtual machine memory layout 300. Linking is the process of taking the in-memory representation of the type and combining it with the run-time state of the virtual machine 104 so that the methods of the type can be executed. Initialization is the process of executing the type constructors to set the starting state of the field and method data 306 of the type and/or create instances on the heap 302 for the initialized type.

The following are examples of techniques for loading, linking, and initializing a class that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, class loader 107 parses the class file 200 corresponding to the class and determines whether the class file 200 is well-formed (meets the syntactic expectations of the virtual machine 104). If not, class loader 107 generates an error. For example, in Java the error might be generated in the form of an exception which is thrown to an exception handler for processing. Otherwise, class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking, and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/ fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/ method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3.5 Loaders

In an embodiment, types may be loaded by one or more loaders. A class loader is an example of a loader. Loading may be initiated by invoking a load method of a loader. A loader may be an object of a reference type. An object of a reference type may be referred to as an "instance." An instance may be created by instantiating a reference type. In an example, a loader may be created by instantiating a loader reference type. "Instantiating" may refer to invoking a constructor method of a type. "Instantiation" may refer to the action of instantiating a type or an instance that results from instantiating a type. It should be noted that a class loader may load types other than classes. For example, a class loader may load an interface.

Two or more loaders of an execution environment may be organized into a hierarchy of parent-child relationships. In an example, a loader may have one parent loader, or a loader may have no parent loader. If a particular loader is the parent of another loader, the particular loader may be referred to as a "parent loader" or a "parent." If another loader is the parent of a particular loader, the particular loader may be referred to as a "child loader" or a "child." A parent loader may be the parent of one or more child loaders. Two or more loaders that share a common parent loader may be referred to as a "sibling loaders" or "siblings." A loader may simultaneously be a parent, a child, and/or a sibling. A loader may also be referred to as an "ancestor loader" or "ancestor" and/or a "descendant loader" or "descendant." For example, consider three loaders: the first loader is the parent of the second loader, and the second loader is the parent of the third loader. The first loader and the second loader may be referred to as "ancestor loaders" or "ancestors" of the third loader. The second loader and third loader may be referred to as "descendant loaders" or "descendants" of the first loader. A loader may have multiple ancestors. Additionally, or alternatively, a loader may have multiple descendants.

A loader of an execution environment may or may not be able to access the types that are loaded by another loader of the execution environment. Whether one loader may access a particular type that has been loaded by another loader may depend upon the two loaders respective positions in a hierarchy of loaders. For example, a child loader generally may access the types that are loaded by the child's parent loader. Conversely, a parent loader generally may not access the types that are loaded by the parent's child loader(s). The restrictions on what types a particular loader may access may also generally apply to the types that are loaded by the particular loader. For example, a type loaded by a parent generally may not access the types that are loaded by a child. In some cases, the restrictions that apply to a type may also apply to instances of the type. Thus, general discussion of what a particular type may access may also be applicable to instances of that particular type. It should be understood that the foregoing are general examples. What generally may be accessible to a particular type may differ from what the particular type might actually access. There may be numerous additional factors that impact and/or control what a particular loader or a particular type may access apart from the relationships of loaders. Access modifiers, type interactions, direct/indirect access mechanisms, and/or other factors may allow one type to access another type that would otherwise generally be inaccessible. For example, consider a first type that generally may not access a second type. If the second type has a public access modifier, it may be that the first type can access the second type.

Two or more loaders may be isolated based on their respective positions in a hierarchy of loaders. For example, a loader generally may not access the types that are loaded by the loader's siblings. Therefore, two or more loaders that share a common parent loader (i.e. sibling loaders) may be isolated loaders. It should be noted that a loader may be isolated from many other loaders apart from the loader's siblings. For example, a loader may also be isolated from one or more ancestors, descendants, siblings' descendants, ancestors' siblings, ancestors' siblings' descendants, and other loaders.

A loader of an execution environment may refuse to load more than one type of a given name. The "name" of a type may refer to a simple name and/or a fully qualified name. Consider, for example, two types: type A and type B. Type A and type B have the same name. A particular loader loads type A. If the particular loader subsequently receives a request to load type B, the particular loader may refuse to load type B. In this example, any operation that requires type B may instead have to rely on type A.

A loader may refuse to load a type having a particular name if the loader can access another type having the same particular name that has previously been loaded by another loader. Consider, for example, a parent loader and a child loader. The parent loader loads type A. The child loader subsequently receives a request to load type B. Type A and Type B have the same name. The child loader may be able to access type A because a child generally may access the types that are loaded by the child's parent. Consequently, the second loader may refuse to load type B.

One loader may delegate a request to load a type to another loader. For example, if a child loader receives a request to load a type, the child loader may delegate the request to the child loader's parent. The parent loader may in turn delegate the request to another ancestor of the child loader (e.g. the parent of the child's parent). If the child loader's ancestors are unsuccessful in attempting to load the type, then the child loader may attempt to load the type.

4. Preventing Library Conflicts

Figure 5:
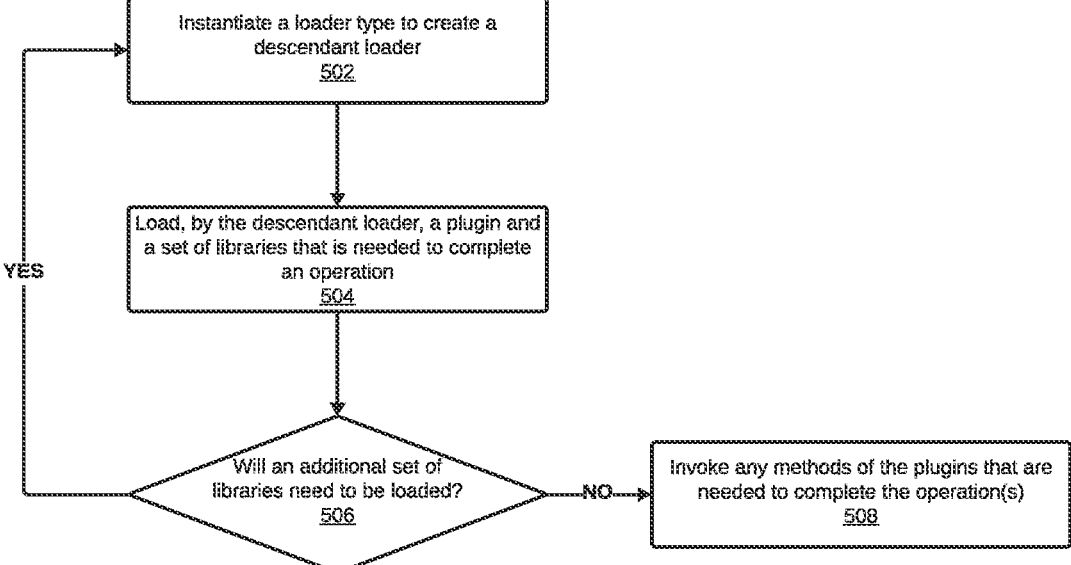
FIG. 5 illustrates an example set of operations for avoiding library conflicts in accordance with one or more embodiments.

FIG. 5 illustrates an example set of operations for preventing failures resulting from library conflicts in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

In operation 502, a loader may be created by instantiating a loader type. For example, a loader may be created by invoking the constructor method of a loader class. In this example, the loader class may be a custom class loader class, a URL loader, and/or any other loader class. Invocations described in this section may originate from one or more invokers. Invocations that originate from an invoker may be direct or indirect. In an example, one or more invocations may originate from an application or an instance of a type of an application. There may be many instances of an application's types. In the discussion herein an invocation that originates from an "application" may refer to the application or an instance of a type of an application. A loader created by an occurrence of operation 502 may be the descendant of one or more loaders of the execution environment. One or more loaders may be created by an occurrence of operation 502. Additionally, or alternatively, there may be one or more repetitions of operation 502. Each descendant loader may be an instance of a single type. Alternatively, two or more descendant loaders may be instances of different types. A descendant loader may be created for each set of libraries that needs to be loaded. It may be a set of libraries loaded by one loader does not conflict with a set of libraries that is loaded by another loader. Loading conflicting sets of libraries by separate loaders may not prevent operation failures resulting from conflicts. For instance, loading conflicting sets of libraries by separate loaders may not prevent operation failures if one loader that loads a set of libraries can access another loader that loads a set of libraries. Consider, for example, two conflicting sets of libraries loaded by two loaders: if the first loader is the parent of the second loader, and if the first loader loads the first set of libraries, the second loader may subsequently refuse to load one or more types of the second set of libraries.

In an embodiment, one or more loaders created by an occurrence of operation 502 may be isolated from other loaders that may load a set of libraries. If two loaders are isolated from each other, each loader may load a type with the same name, and each type may be treated as a distinct type. Consequently, operation failures resulting from library conflicts may be prevented. For example, consider two loaders: loader A and loader B. Loader A loads library set A which includes type A. Loader B loads library set B which includes type B. Type A and type B are conflicting types. If loader A and loader B are isolated loaders, both type A and type B may be loaded. Thus, operation A may rely on type A, and operation B may rely on type B.

In an embodiment, each descendant loader that is created by an occurrence of operation 502 may be isolated based on each descendant loader's respective position in a hierarchy of loaders. For example, if each descendant loader shares a common parent, then each descendant loader will be a sibling loader. Therefore, each descendant loader will be isolated from the other descendant loaders. Additionally or alternatively, descendant loaders may be isolated based on relationships other than a sibling relationship. Embodiments may load two or more conflicting sets of libraries through any isolated loaders of an execution environment. A descendant loader's position in a hierarchy of loaders may be defined when the descendant loader is created in operation 502.

In an embodiment, a descendant loader's position in a hierarchy of loaders may be dictated based on descendant loader's parent. Various techniques may be employed in operation 502 in order to define the parent-child relationship for each descendant loader. For example, when a loader class is instantiated, a parent for the resulting loader may be specified. If no parent is specified at instantiation, the parent of a resulting loader may depend on the invoker of the loader type's constructor method. Consider, for example, a first loader that loads a type. The type instantiates a loader class to create a second loader. Assuming no parent for the second loader was specified, the first loader may be the parent of the second loader, because the first loader loaded the type. The parent-child relationship of a descendant loader created in operation 502 may be defined by any technique discussed herein and/or any other technique.

In operation 504, a loader may load a plugin and a set of libraries. The loader may be a descendant loader created in operation 502. The set of libraries and the plugin may be loaded by a single loader or by separate loaders. If a plugin and a set of libraries are loaded by a single loader, the set of libraries may generally be accessible to the types of the plugin. However, a set of libraries and a plugin that requires the set of libraries do not necessarily need to be loaded by the same loader. The plugin and a set of libraries may be loaded by any two loaders of an execution environment. For example, a required set of libraries could be loaded by any loader whose loaded types are accessible to the loader that loads the plugin. A plugin may include one or more types. An instance of a type of a plugin may be referred to as a "plugin instance." A single type included within a plugin may contain one or more methods. A "method of a plugin" or "plugin method" may also refer to a method of a plugin instance. Plugin methods may include abstract or non-abstract methods inherited from other types. A plugin method may include instructions for completing a large variety of operations. Extraction operations and conversion operations are just two of many examples of operations for which instruction may be included in a method of a plugin. An "extraction method" may generally refer to any method of a plugin that includes instructions for an extraction operation. In an example, an extraction operation may entail creating a copy of a data set and/or it may entail removing a data set from a data source. An extraction method may result in a data object. A "conversion method" may generally refer to any plugin method that includes instructions for a conversion operation. A method of a plugin may include instructions for completing more than one operation. For example, a method of the plugin may include instructions for an extraction operation as well as a conversion operation.

If a method includes instructions for interacting with one or more systems, the interactions may be facilitated through one or more application programming interfaces (APIs). Invoking a method of a plugin may cause the plugin to make one or more API calls to a data source in order to perform the method. A method may be designed to use various functionalities of an API. Examples of API functionalities that may be utilized by a plugin method include a registry functionality, a connection functionality, a read functionality, a metadata functionality, a call functionality, a write functionality, a data validation functionality, and other functionalities. In an example, a connection functionality may be utilized to establish a connection to a system. A read functionality may be utilized to define a set of schemas and/or entities to identify in a data set. A read functionality may allow for the identification of native data models in a data source and thereby facilitate a more effective extraction operation. For instance, the read functionality may be utilized to identify what fields to look for in a data set and what datatypes to expect in what fields. A metadata functionality may allow an application to access metadata that is associated with and/or included in a data set of a data source.

In operation 506, the system may determine if an additional set of libraries will need to be loaded. For example, an additional set of libraries may be required if a method that is to be invoked requires a library that was not loaded in operation 504. However, it should be noted that not every method may require the use of a set of libraries. Moreover, multiple methods may rely on a single set of libraries. If no additional set of libraries needs to be loaded (NO in operation 506), the system may proceed to operation 508. If an additional set of libraries does need to be loaded (YES in operation 506), the system may return to operation 502. That is, the system may create a new descendant loader in operation 502. The new descendant loader will be used to load a plugin and the additional set of libraries in operation 504. Then the system may return to operation 506.

In operation 508, one or more methods of a plugin(s) may be invoked to cause their execution in the execution environment. In an example, one or more types may be instantiated prior to the invocation of one or more methods of plugins. For example, a class of a plugin may be instantiated to create an instance. A method of the instance may subsequently be invoked. Additionally, or alternatively, a method of a type of a plugin may be a static method. In this scenario, an instance may not need to be created prior to invocation of the method. A method of a plugin may be invoked through an interface. Additional embodiments and/or examples relating to interfaces are described below in Section 4 titled "Accessing Types Loaded by Isolated Loaders."

5. Accessing Types Loaded by Isolated Loaders

In an embodiment, an interface may be utilized to access types loaded by isolated loaders. Utilizing an interface may allow access to types that would be otherwise generally inaccessible. For example, an application loaded by an ancestor of two or more isolated loaders may need to invoke methods of plugins loaded by each isolated loader. However, recall that a type loaded by a parent generally may not access a type loaded by a child. Thus, even if the application were loaded by the direct parent of both isolated loaders, the application generally would not be able to invoke either method of either plugin. For example, consider two isolated descendant loaders: loader A and loader B. Loader A loads plugin A and loader B loads plugin B. Plugin A contains type A and plugin B contains type B. Type A contains method A and type B contains method B. An application may be loaded through a shared ancestor of loader A and loader B. The application needs to invoke method A and method B. The method body of method A contains instructions for completing a first operation, and the method body of method B contains instructions for completing a second operation. Generally, the application would not be able to invoke method A or method B.

In an embodiment, one or more interfaces may be loaded by one or more loaders of a group of loaders. A loader that loads an interface may be an ancestor of one or more loaders that load a plugin. It may be that a loader that loads an interface is a parent of one or more loaders that loads a plugin. A type may be able to implement an interface if it can access the interface. For example, if a parent loader loads an interface, a class loaded by a child loader may implement the interface. A type that may access the interface may be able to utilize the interface to access types that implement the interface. For example, if a parent loader loads a type and an interface, a class loaded by a child loader may implement the interface, and the type may utilize the interface to access the class. However, in an embodiment it may be that an interface is loaded by any loader of a hierarchy of loaders. It should be understood that in some cases the accessibility of an interface may depend on factors other than the parent-child relationships of the loader that loads the interface. For example, access modifiers may affect the accessibility of the interface.

In an embodiment, one or more interfaces may be implemented by one or more types. An interface that may be utilized to access a type of a plugin may be referred to as a "plugin interface." A plugin interface may include one or more abstract methods and/or non-abstract methods. One or more methods of a plugin interface may be static methods. One or more plugins may implement a plugin interface. A plugin may be said to implement a plugin interface if it contains one or more types that implement the interface. A plugin that implements a plugin interface may inherit abstract and/or non-abstract methods of a plugin interface. A plugin that implements a plugin interface may provide implementation to the abstract methods of a plugin interface. Each plugin that implements a plugin interface may provide a different implementation for each abstract method of the plugin interface. Consider, for example, two extractions operations that need to be completed: data set A needs to be extracted from data source A, and data set B needs to be extracted from data source B. Data source A is a different variety of data source than data source B. For instance, data source A may be a relational database and data source B may be a NoSQL database. Moreover, data set A may accord to a different data model than data set B. As a result of the foregoing, the instructions that are needed to extract data set A may be very different from the instructions that are needed to extract data set B. Nonetheless, both extraction operations could be initiated from a single plugin interface that declares a single abstract method. For instance, consider two plugins that implement a plugin interface having a single abstract method. Plugin A contains class A, and class A implements the plugin interface. Class A contains method A. Plugin B contains class B, and class B also implements the plugin interface. Class B contains method B. Method A, method B, and the single abstract method of the plugin interface may all share the same particular method signature. The method body of method A (method body A) includes instructions for completing extraction operation A. Method body A is the implementation that Class A provides to the single abstract method. The method body of method B (method body B) includes instructions for completing extraction operation B. Method body B is the implementation that Class B provides to the single abstract method. An invoker may invoke the single abstract method with respect to either implementation.

In an embodiment, one or more methods of a plugin may be invoked through an interface. A method of a plugin may be invoked through the plugin interface by invoking a method of the plugin interface with respect to a plugin type or plugin instance. A method of a plugin that is invoked through the plugin interface may provide implementation to an abstract method of the interface. Additionally or alternatively, a method of a plugin invoked through the interface may have been a non-abstract method inherited by the plugin from the plugin interface. Consider the example above. Class A may be instantiated to create instance A, and Class B may be instantiated to create instance B. Method A may be invoked through the interface by invoking the abstract method of the plugin interface with respect to instance A. This may cause the execution of the instructions of method body A resulting in the completion of extraction operation A. Method B may be invoked through the plugin interface by invoking the abstract method of the plugin interface with respect to instance B. This may result in the completion of extraction operation B. In an alternative example, it may be that it is not necessary to instantiate class A or class B. For example, the use of static methods may eliminate the need to instantiate a class prior to invoking a method of the class. In this case, method A may be invoked through the plugin interface by invoking the abstract method of the plugin interface with respect to class A. Method B may be invoked through the plugin interface by invoking the abstract method of the plugin interface with respect to class B causing extraction operation B.

In an embodiment, a plugin interface may be a generic interface. A generic interface is an interface that may be parameterized with one or more type parameters. This may allow the plugin interface to work with different types in a type-safe manner.

In an embodiment, additional or alternative techniques may be utilized to access the types that are loaded by isolated loaders. For example, reflection operations (e.g. from the java reflection API) may be used to access types in one or more embodiments. Reflection may be utilized to instantiate a type of a plugin that has been loaded by an isolated loader, invoke a static method plugin, invoke a method of a plugin instance, cast an object (e.g. a data object) to another type, and/or for other purposes.

6. Extracting and Converting Data

Figure 6:
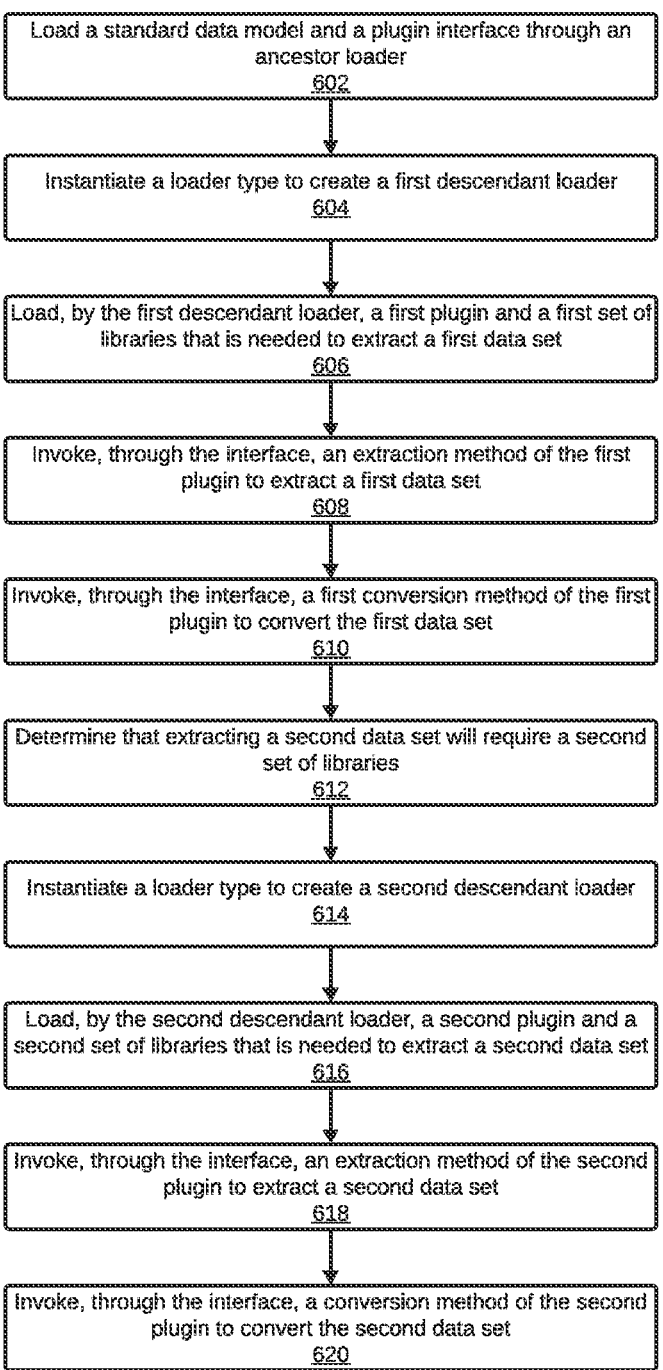
FIG. 6 illustrates an example set of operations for extracting and converting data sets in accordance with one or more embodiments.

FIG. 6 illustrates an example set of operations for extracting and converting data sets from heterogenous data sources in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

Heterogenous data sources may include, for example, relational databases, NoSQL databases, in-memory databases, time-series databases, spatial databases, XML databases, and many others. A single data source may house heterogenous data. A data source may be included in the same computing device or system as the system performing the operations illustrated in FIG. 6. Additionally, or alternatively, a data source may be external to the system performing the operations illustrated in FIG. 6. Data sources may be on-premises or cloud-based. A data set may include data and/or metadata.

The operations illustrated in FIG. 6 may occur in response to a wide variety of triggers, conditions, events, etc. In an example, the operations illustrated in FIG. 6 may occur in response to receiving a service initialization. A service initialization may occur in response to receiving user input by a computer system such as computer system 700. Invocations described in this section may originate from one or more invokers. Invocations that originate from an invoker may occur directly or indirectly. In an example, one or more invocations described in this section may originate from an application (or instance thereof). Invoking a method of a plugin may cause the plugin to make one or more application interface calls to a data source in order to perform the method.

In operation 602, a standard data model and a plugin interface may be loaded by a loader that is an ancestor loader in a hierarchy of loaders. The ancestor loader may be an ancestor of one or more loaders that load a plugin and/or a set of libraries. Multiple plugin interfaces and/or standard data models may be loaded in this operation. A standard data model and a plugin interface may be loaded through separate loaders. A standard data model may be a generic data model. The plugin interface may be a generic interface. A plugin interface may contain one or more abstract methods. A plugin interface may also contain non-abstract methods and/or static methods. In an example, the loading of the standard data model and/or the plugin interface may be caused by one or more invocations of a load method of the ancestor loader. One or more types of the application may have previously been loaded by the ancestor loader or another loader of the execution environment. In this example, the plugin interface may declare a first abstract method, a second abstract method, and/or other methods.

In operation 604, a first descendant loader may be created by instantiating a loader type. The first descendant loader may be a descendant of the ancestor loader. The first descendant loader may be the child of the ancestor loader.

The first descendant loader being a child of the ancestor loader may allow the first descendant loader and the types that are loaded by the first descendant loader to access the types loaded by the ancestor loader. For example, the types loaded by the first descendant loader may be able to access the standard data model and the plugin interface. In an example, the first descendant loader may be created by invoking the constructor method of a loader class. The loader class may have previously been loaded by the ancestor loader or another loader of the execution environment. The loader class may be instantiated such that the resulting first descendant loader is a child of the ancestor loader.

In operation 606, a first plugin and a first set of libraries may be loaded by the first descendant loader. The first plugin may implement the plugin interface. The first plugin may contain one or more types. A type of the first plugin may contain one or more methods. One or more methods of the first plugin may provide implementation to one or more abstract methods of the plugin interface. One or more non-abstract methods of the first plugin may be inherited from the plugin interface. A method of the first plugin may include instructions for a variety of P a e 27 operations such as extraction operations, conversion operations, and/or other operations. A method of the first plugin may contain instructions for more than one operation. For example, a method of the first plugin may contain instructions for an extraction operation and a conversion operation. The first set of libraries may be needed to complete one or more methods of the first plugin. In an example, the loading of the first plugin and the first set of libraries may be caused by one or more invocations of a load method of the first descendant loader. The first plugin may include a first class that implements the plugin interface. The first class may include a first extraction method. The method signature of the first extraction method may be identical to the method signature of the first abstract method of the plugin interface. The method body of the first extraction method may include instructions for accessing a first data set in a first data source. For instance, the method body may include instructions for accessing a data set stored at an address in a relational database. Successfully executing the first extraction method may require the use of the first set of libraries. The first set of libraries may include one or more system libraries of the first data source. The first set of libraries may also include one or more third-party libraries upon which the system libraries depend. The first class may further include a first conversion method. The method signature of the first conversion method may be identical to the method signature of the second abstract method of the plugin interface. The method body of the first conversion method may include instructions for converting the first data set from a first native data model into the standard data model.

In operation 608, the first extraction method of the first plugin may be invoked through the plugin interface. The first extraction method may include instructions for extracting a data set of a first data model from a first variety of data source. The method body of the first extraction method may be implementation provided to an abstract method of the plugin interface. In an example, the first class may be instantiated to create an instance of the first class (referred to herein as the "first instance") prior to the invocation of the first extraction method. The first class may be instantiated by invoking the constructor method of the first class. The first extraction method may subsequently be invoked through the interface by invoking the first abstract method of the plugin interface with respect to the first instance. This may result in the extraction of the first data set from the first data source.

The first data set may be returned as a first data object that accords to a first native data model (referred to herein as a "first model").

In operation 610, the first conversion method of the first plugin may be invoked through the plugin interface. The first conversion method may result in one or more data sets being converted into the standard data model. The first conversion method may be a static method or otherwise. The method body of the first conversion method may be implementation provided to an abstract method of a plugin interface. The first conversion method may be a non-abstract method inherited from the plugin interface. The first conversion method may result in the conversion of data of a native data model into a generic data model. Converting data from native data models into the generic data model may allow data extracted from heterogeneous sources to be used concurrently by the requestor of the data sets in a type-safe manner. In an example, the first conversion method may be invoked through the plugin interface by invoking the second abstract method of the plugin interface with respect to the first instance. This may result in the first data object being converted from a first native data model into the standard data model. In this example, the standard data model may be a generic model. Therefore, the first conversion method may return a first generic data object. The first generic data object may include a name that has been taken from the first data set. Thus, the first generic data object may have a similar or identical name to the first native data object. A single field of a native data object may be represented by two or more fields of a corresponding generic data object. For instance, consider one particular field of the first native data object (referred to herein as the "first field"). The first field may only accept values of a first data type. The first field may hold a first value of the first data type. The first generic data object may include two or more fields that represent the first field. For instance, the first generic data object may have one field the represents the first value and another field that represents the first datatype. A datatype of a field is just one of many properties of a native data object that may be represented in separate fields of a generic data object. Based on the generic standard data model, the data types of each generic field of a generic data object may be customized.

In operation 612, the system may determine that a second extraction operation will require a second set of libraries. Two extraction operations may not always require two sets of libraries. For example, two extraction operations may be directed at two data sets that are located within the same data source, and the two data sets may accord to the same data model. In this scenario, the second data set may be extracted merely be a second invocation of the first extraction method. Similarly, the second data set may be converted to accord to the second data model by a second invocation of the first conversion method. However, in these example operations the system may determine that a second extraction operation will require a second set of libraries. In an example, a second extraction operations may require a second set of libraries if the second data set exists in a second data source. For instance, extracting from the second data source may require different system libraries and/or third-party-libraries.

In operation 614, a second descendant loader may be created by instantiating a loader type. The second descendant loader and the first descendant loader may be two instances of the same loader type or instances of different loader types. The second descendant loader may be a descendant of the ancestor loader. The second descendant loader may be a child of the ancestor loader. The second descendant being a child of the ancestor loader may allow the second descendant loader and the types that are loaded by the second descendant loader to generally access the types loaded by the ancestor loader. The second descendant loader may be isolated from the first descendant loader. In an example, the second descendant loader may be created by invoking the constructor method of a loader class. The loader class may be instantiated such that the resulting second descendant loader is a child of the ancestor loader. Consequently the first descendant loader and the second descendant loader may be siblings and therefore isolated loaders.

In operation 616, a second plugin and a second set of libraries may be loaded by the second descendant loader. The second plugin may implement a plugin interface. The second plugin may implement the same plugin interface as the first plugin. The second plugin may contain one or more types. A type of the second plugin may contain one or more methods. One or more methods of the second plugin may provide implementation to one or more abstract methods of the plugin interface. One or more methods of the second plugin may be inherited from the plugin interface. A method of the second plugin may include instructions for a variety of operations such as extraction operations, conversion operations, and/or other operations. A method of the second plugin may contain instructions for more than one operation. For example, a method of the second plugin may contain instructions for an extraction operation and a conversion operation. The second set of libraries may be needed to complete one or more methods of the second plugin. The second set of libraries may conflict with the first set of libraries. In an example, the loading of the second plugin and the second set of libraries may be caused by one or more invocations of a load method of the second descendant loader. The second plugin may include a second class that implements the plugin interface. The second class may include a second extraction method. The method signature of the second extraction method may be identical to the method signature of the first abstract method of the plugin interface as well as the method signature of the first extraction method. The method body of the second extraction method may include instructions for accessing a second data set in a second data source. For instance, the method body may include instructions for accessing a data set stored at an address in a NoSQL database. The method body of the second extraction method may be very different from the method body of the first extraction method. Therefore, the implementation provided to the first abstract method by the second plugin may be very different from the implementation provided to the first abstract method by the first plugin. Successfully executing the second extraction method may require the second set of libraries. The second set of libraries may include one or more system libraries of the second data source system. The second set of libraries may include third-party libraries upon which the system libraries depend. The second set of libraries may conflict with the first set of libraries because the first set of libraries and the second set of libraries include different versions of one or more third-party libraries. The second class may further include a second conversion method. The method signature of the second conversion method may be identical to the method signature of the second abstract method of the interface and the first conversion method. The method body of the second conversion method may include instructions for converting the second data set from a second native model into the standard data model.

In operation 618, a second extraction method of the second plugin may be invoked through the plugin interface.

The second extraction method may include instructions for extracting a data set of a second data model from a second variety of data source. In an example, the second class may be instantiated to create an instance of the second class (referred to herein as the "second instance") prior to the invocation of the second extraction method. The second extraction method may subsequently be invoked through the interface by invoking the second abstract method of the plugin interface with respect to the second instance. This may result in the extraction of the second data set from the second data source. The second data set may be returned as a second data object that accords to a second native data model (referred to herein as a "second model").

In operation 620, a second conversion method of the second plugin may be invoked through the plugin interface. The second conversion method may result in one or more data sets being converted into the standard data model. The second conversion method may be a static method or otherwise. The method body of the second conversion method may be implementation provided to an abstract method of a plugin interface. The second conversion method may be a non-abstract method inherited from the plugin interface. The second conversion method may result in the conversion of data of a native data model into a generic data model. The generic standard data model may be customized such that each resulting generic data object has fields of consistent data types. In an example, the second conversion method may be invoked through the plugin interface by invoking the second abstract method of the plugin interface with respect to the second instance. This may result in the second data object being converted from the second model into the standard data model. In this example, the standard data model may be a generic data model. A data object of the second model may have many fields and each field may accept values of a particular data type. Consider one particular field of the second data object (referred to herein as the "second field"). The second field may only accept values of a second data type. The second filed may hold a second value of the second particular data type. The corresponding generic data object that results from converting the second data object according to the standard data model may include two or more fields that represent the second field. For instance, the second generic data object may have one field that represents the second value and another field that represents the second datatype.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
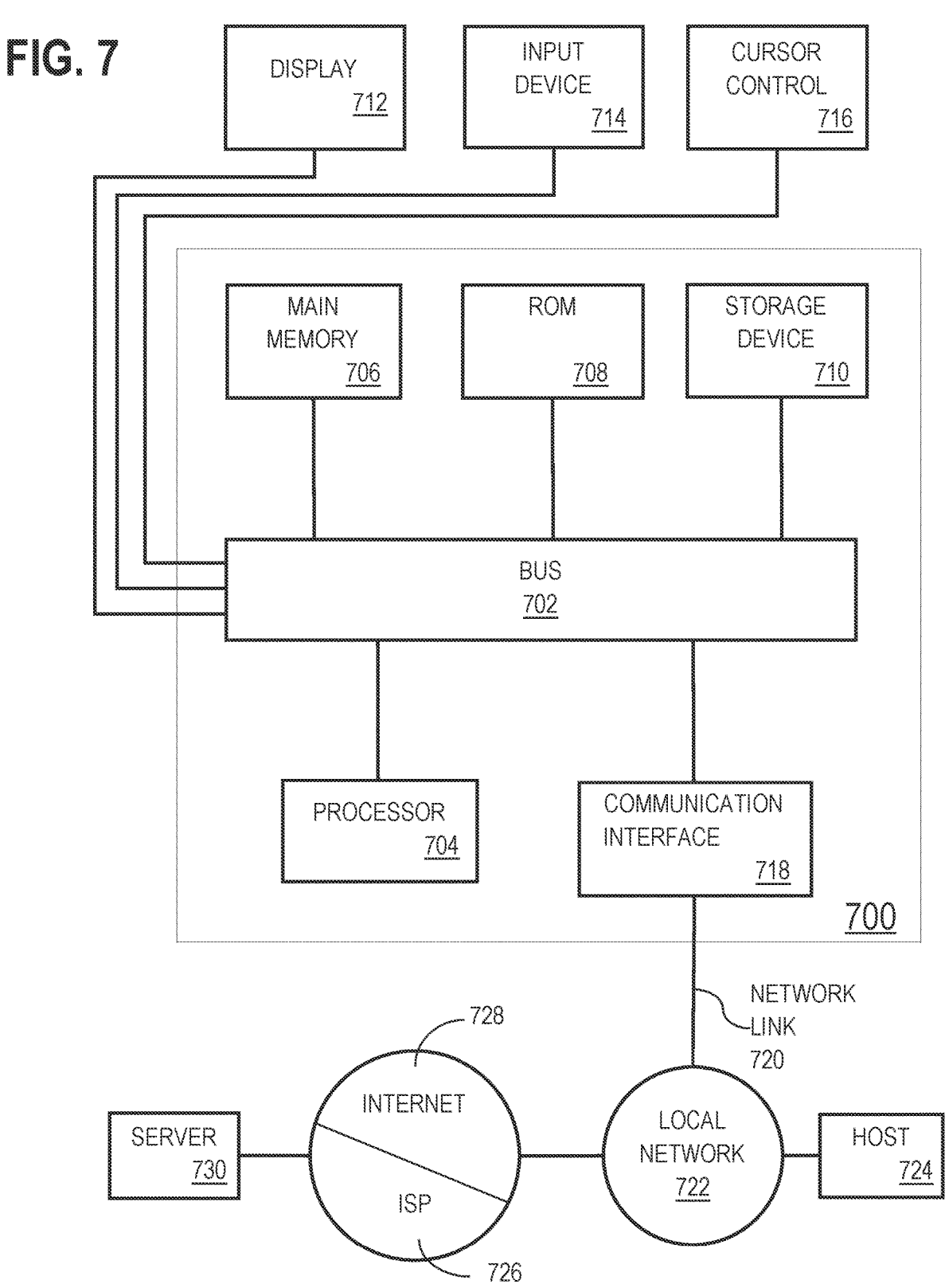
FIG. 7 depicts a block diagram that depicts a hardware system in accordance with one or more embodiments.

For example, FIG. 7 is a block diagram that illustrates a computer system 700 upon which an embodiment of the disclosure may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

8. Miscellaneous; Extensions

Embodiments are directed to a system with one or more devices that include a hardware processor and that are configured to perform any of the operations described herein and/or recited in any of the claims below.

Embodiments are directed to a system including means to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
   instantiating a loader type to create a first descendant loader that is a first descendant of an ancestor loader;
   instantiating the loader type to create a second descendant loader that is a second descendant of the ancestor loader;
   loading, by the first descendant loader into an execution environment, a first plugin and a first set of one or more libraries needed to complete a first operation;
   loading, by the second descendant loader into the execution environment, a second plugin and a second set of one or more libraries needed to complete a second operation;
   wherein a first type comprised within the first set of one or more libraries and a second type comprised within the second set of one or more libraries (a) cannot be loaded by a same loader into the execution environment and (b) can be loaded into the execution environment using different loaders;
   invoking a first method of the first plugin, the first method comprising instructions for completing the first operation; and
   invoking a second method of the second plugin, the second method comprising instructions for completing the second operation,
   wherein the method is executed by at least one device including a hardware processor.

2. The method of claim 1, wherein the first type and the second type cannot be loaded into a same execution environment based on the first type and the second type both having a same name.

3. The method of claim 1, wherein both the first plugin and the second plugin implement a plugin interface that is loaded by the ancestor loader into the execution environment.

4. The method of claim 3:
   wherein the plugin interface declares an abstract method;

wherein the first method (a) implements the abstract method and (b) is invoked through the plugin interface; and wherein the second method (a) implements the abstract method and (b) is invoked through the plugin interface.

5. The method of claim 1, wherein the first method comprises instructions for extracting a first data set from a first data source, and wherein the second method comprises instructions for extracting a second data set from a second data source.

6. The method of claim 5, further comprising:

loading, by the ancestor loader into the execution environment, a standard data model;

invoking, a third method of the first plugin, the third method comprising instructions for converting the first data set from a first data model into the standard data model; and invoking, a fourth method of the second plugin, the fourth method comprising instructions for converting the second data set from a second data model into the standard data model.

7. The method of claim 6, wherein the standard data model is a generic data model.

8. The method of claim 5, wherein the first method further comprises instructions for converting the first data set from a first data model into a standard data model, wherein the second method further comprises instructions for converting the second data set from a second data model into the standard data model, and further comprising:

loading, by the ancestor loader into the execution environment, the standard data model.

9. The method of claim 1, wherein the first descendant loader is isolated from the second descendant loader, and wherein the second descendant loader is isolated from the first descendant loader.

10. One or more non-transitory computer-readable media comprising instructions which, when executed by one or more hardware processors, cause performance of operations comprising:

instantiating a loader type to create a first descendant loader that is a first descendant of an ancestor loader;

instantiating the loader type to create a second descendant loader that is a second descendant of the ancestor loader;

loading, by the first descendant loader into an execution environment, a first plugin and a first set of one or more libraries needed to complete a first operation;

loading, by the second descendant loader into the execution environment, a second plugin and a second set of one or more libraries needed to complete a second operation;

wherein a first type comprised within the first set of one or more libraries and a second type comprised within the second set of one or more libraries (a) cannot be loaded by a same loader into the execution environment and (b) can be loaded into the execution environment using different loaders;

invoking a first method of the first plugin, the first method comprising instructions for completing the first operation; and invoking a second method of the second plugin, the second method comprising instructions for completing the second operation.

11. The one or more non-transitory computer-readable media of claim 10, wherein the operations further comprise:

loading, by the ancestor loader, a plugin interface, wherein the plugin interface is implemented by at least one of (a) the first plugin or (b) the second plugin.

12. The one or more non-transitory computer-readable media of claim 11:

wherein the plugin interface declares an abstract method;

wherein the first method (a) implements the abstract method and (b) is invoked through the plugin interface; and wherein the second method (a) implements the abstract method and (b) is invoked through the plugin interface.

13. The one or more non-transitory computer-readable media of claim 10, wherein the first method comprises instructions for extracting a first data set from a first data source, and wherein the second method comprises instructions for extracting a second data set from a second data source.

14. The one or more non-transitory computer-readable media of claim 13, wherein the operations further comprise:

loading, by the ancestor loader into the execution environment, a standard data model, wherein the standard data model is a generic data model;

invoking, a third method of the first plugin, the third method comprising instructions for converting the first data set from a first data model into the standard data model; and invoking, a fourth method of the second plugin, the fourth method comprising instructions for converting the second data set from a second data model into the standard data model.

15. The one or more non-transitory computer-readable media of claim 10, wherein the first descendant loader is a sibling of the second descendant loader.

16. A system comprising:

at least one device comprising one or more hardware processors;

the system being configured to perform operations comprising:

instantiating a loader type to create a first descendant loader that is a first descendant of an ancestor loader;

instantiating the loader type to create a second descendant loader that is a second descendant of the ancestor loader;

loading, by the first descendant loader into an execution environment, a first plugin and a first set of one or more libraries needed to complete a first operation;

loading, by the second descendant loader into the execution environment, a second plugin and a second set of one or more libraries needed to complete a second operation;

wherein a first type comprised within the first set of one or more libraries and a second type comprised within the second set of one or more libraries (a) cannot be loaded by a same loader into the execution environment and (b) can be loaded into the execution environment using different loaders;

invoking a first method of the first plugin, the first method comprising instructions for completing the first operation; and invoking a second method of the second plugin, the second method comprising instructions for completing the second operation.

17. The system of claim 16, wherein both the first plugin and the second plugin implement a plugin interface, wherein the first method is invoked through the plugin interface, and wherein the second method is invoked through the plugin interface.

18. The system of claim 16, wherein the first method comprises instructions for extracting a first data set from a first data source, and wherein the second method comprises instructions for extracting a second data set from a second data source.

19. The system of claim 18, wherein the operations further comprise:

loading, by the ancestor loader into the execution environment, a standard data model, wherein the standard data model is a generic data model;

invoking, through a plugin interface, a third method of the first plugin, the third method comprising instructions for converting the first data set from a first data model into the standard data model; and invoking, through the plugin interface, a fourth method of the second plugin, the fourth method comprising instructions for converting the second data set from a second data model into the standard data model.

20. The system of claim 16, wherein the ancestor loader is a parent of the first descendant loader, and the second descendant loader.

*   *   *   *   *